United States Patent [19]

Takizawa et al.

[11] Patent Number: 5,525,050
[45] Date of Patent: Jun. 11, 1996

[54] TEMPERATURE CONTROL UNIT FOR INJECTION MOLDING MACHINES

[75] Inventors: Michiaki Takizawa; Takashi Magario, both of Nagano, Japan

[73] Assignee: Nissei Plastic Industrial Co., Ltd., Nagano-ken, Japan

[21] Appl. No.: 305,994

[22] Filed: Sep. 19, 1994

[51] Int. Cl.$^6$ .................................................. B29C 45/78
[52] U.S. Cl. ........................ 425/143; 264/40.6; 425/144
[58] Field of Search .................................. 425/143, 144; 264/40.6

[56] References Cited

U.S. PATENT DOCUMENTS

| 4,695,237 | 9/1987 | Inaba | 425/144 |
| 4,784,595 | 11/1988 | Halter | 425/144 |

FOREIGN PATENT DOCUMENTS

| 62-144617 | 9/1987 | Japan |
| 64-30725 | 2/1989 | Japan |
| 2-55114 | 2/1990 | Japan |

Primary Examiner—Tim Heitbrink

[57] ABSTRACT

A temperature control unit for an injection molding machine having a control thermostat capable of detecting the temperature of a fluid flowing out of dies, wherein plural injection unit thermostats are coupled to the control thermostat. A heating/cooling dual control thermostat is provided for detecting the temperature of the fluid flowing into the dies and the heating/cooling dual control thermostat is coupled to the control thermostat in a cascade connection, whereby an injection unit temperature control system and a die temperature control system are connected via a communication line. The resulting temperature control unit has a simplified construction for temperature control and has reduced cost, while improving operability and maneuverability thereof. By cascade-controlling the die temperature, highly stabilized temperature control may be realized.

15 Claims, 2 Drawing Sheets

TEMPERATURE CONTROL UNIT FOR INJECTION MOLDING MACHINES

FIELD OF THE INVENTION

The present invention relates to a temperature control unit for use in temperature control by a thermostat coupled communicatively with a controller.

DESCRIPTION OF THE BACKGROUND ART

The screw-incorporated barrel cylinder of an injection molding machine thus far used is heated with band type heaters installed respectively at the fore part (metering zone), intermediate part (compression zone) and rear part (feed zone) as disclosed in Japanese Patent Publication Laid-Open No. 55114-1990 while at the same time the heating temperatures at the respective zones are detected by a plurality of temperature sensors corresponding to said respective zones to perform temperature control with a controller. Further, the injection nozzle at the fore end of the barrel cylinder was also mounted with a temperature sensor for injection nozzle temperature control, and the hydraulic circuit had its oil temperature detected also with a temperature sensor. As temperature detection (temperature control) for the barrel cylinder, etc. is done in a high-temperature zone in this case, normally, thermostats are used as temperature sensors.

Incidentally, as shown in FIG. 2, of the present application, each of thermostats (temperature sensors) 3, . . . provided for injection unit M is branch connected in T-form, using a coupling cable such as RS-485 (trade name) with thermostat 3 serving as a master thermostat coupled to controller 2 having a computer function via data communication line 14 comprising an optical fibre cable, whereby injection unit temperature control system Ai undertaking temperature control for injection unit M is thus formed, wherein serial data communication is performed between controller 2 and each of individual thermostats 3, . . . according to a polling select system. Namely, in response to a call from controller 2, each of these thermostats 3, . . . is selected while each of detected values (numerical data) $D_3$, $D_4$, $D_5$, $D_6$ and $D_7$ are transmitted sequentially therefrom to controller 2 and displayed on the display 15 of the controller 2. Also, command values $S_3$, $S_4$, $S_5$, $S_6$ and $S_7$ of temperature designated by injection unit temperature selector 16 of controller 2 are transferred to respective thermostats 3, . . . and following these command values $S_2$, . . . and detected values $D_2$, . . . , control signals are subsequently fed to heaters 26, 27, 28, 29 installed respectively at, the metering zone (fore part), the compression zone (intermediate part) and the feed zone (rear part) of injection nozzle 21 and barrel cylinder 22, whereby feedback control of temperature is effected.

Meanwhile, temperature control of dies was carried out, using a die temperature regulator as disclosed in Japanese Patent Application Laid-Open No. 30725-1989. Presented in FIG. 2 of the present application is a die temperature control system Am provided with die temperature regulator 8. This die temperature control system Am runs with fluid, the temperature of which is regulated by die temperature regulator 8 supplied to circulated through) die 9, whereby die temperature control is performed.

In this case, die temperature regulator 8 is fed with command value Sm of die temperature designated by die temperature selector 17, to carry out feedback control of die temperature. Incidentally, similarly to the injection unit side, the die temperature control system Am is capable of remote control via a data communication line (refer to Japanese Utility Model Application Laid-Open No. 144617-1987).

However, because a conventional temperature control unit was constituted as comprising injection unit temperature control system Ai and die temperature control system Am being provided as separate control systems, the configuration of both hardware and software became complicated which resulted not only in a large increase of cost but also in deterioration of operability and maneuverability.

The reason why the conventional temperature control unit is constituted with separate control systems Ai and Am is described hereunder. Generally, because injection nozzle 21 and barrel cylinder 22 both have a function to melt molding material, the temperature of heating thereof is stabilized over a high-temperature range from 150° through 400° C. Therefore, it suffices that each of thermostats 3, . . . provided on the side off the injection unit is a thermostat capable of performing on/off-control each of heaters 26, . . . for the control of heating (heating only). On the other hand, the thermostat provided for dies 9 has respective functions to heat or cool the resin filled in a cavity within dies 9 and maintain the die temperature at a relatively low temperature range from 40° through 100° C. Accordingly, die temperature regulator 8 is required to function for not only heating to keep the die temperature at a setpoint but also for cooling to suppress the rise of die temperature due to the heat released from molten resin, whereby the thermostat used for die temperature control is required to perform dual control for heating and cooling. Meanwhile, when a heating/cooling dual control thermostat is compared with a heating control thermostat, the data related to setpoints and monitoring items and required for the former are almost twice as much similar data for the latter, regardless of conditions as to such control actions as (PID action, P action, PI action, etc. ) . Therefore, coupling the heating/cooling dual control thermostat and the heating control thermostat to controller 2 via a single data communication line results in a much more complex communication system and increase of cost than constituting with separate Ai and Am control systems.

SUMMARY OF THE INVENTION

An object of the present invention is to provide a temperature control unit for injection molding machines, wherein an injection unit temperature control system and a die temperature control system are connected, using a single data communication line, whereby not only their system configurations may be largely simplified but also their operability and maneuverability may be improved.

Another object of the present invention is to provide a temperature control unit for an injection molding machine, wherein die temperature cascade control is implemented, whereby a highly stable die temperature control may be achieved.

To achieve these objects of the present invention a controller is used to control an injection unit temperature control system, which provides for temperature control of the injection unit with first heating control thermostats connected in a manner to be capable of serial data communications by, for example, a polling select system. A die temperature control system is also provided which controls die temperature with a heating/cooling control thermostat, while die circulating fluid temperature is regulated by a die temperature regulator. A second heating control thermostat capable of detecting temperature of the fluid flowing out from the die is specially provided. The second heating control thermostat is connected to the first heating control thermostats on the side of injection unit and by providing the heating/cooling control thermostat in a manner capable of detecting temperature of fluid flowing into dies, the heating/cooling control thermostat and the second heating control thermostat are coupled in cascade connection.

Thus, the second heating control thermostat for heating control and the heating/cooling dual control thermostat are coupled together in a cascade connection, whereby the second heating control thermostat becomes a master thermostat and the heating/cooling dual control thermostat becomes a slave thermostat to perform cascade control. Namely, the second heating control thermostat is fed with a command value from the controller of the injection unit temperature control system and detects the temperature of the fluid flowing out from the dies for die temperature control, while at the same time, the heating/cooling dual control thermostat performs heating/cooling control of the die temperature regulator following various setpoints locally selected in advance. Further, according to the cascade control mode, the controlled variable based on the detected value and a setpoint from the second heating control thermostat is output as a command value to the heating/cooling dual control thermostat, whereby the heating/cooling dual control thermostat is controlled by the command value.

Meanwhile, the first heating control thermostats and the second heating control thermostat are coupled to the controller of injection unit temperature control system in a manner capable of serial data communication according to the polling select system. Therefore, temperature control of the injection unit by the controller and also data communications between the second heating control thermostat in the die temperature control system Am and controller 2 are made feasible, with the result that both the injection unit temperature control system and the die temperature control system can be remote-controlled from the controller via the same data communication line.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Preferred embodiments of the present invention are enumerated below, and described in detail with reference to the accompanying drawings provided hereunder.

Figure 1:
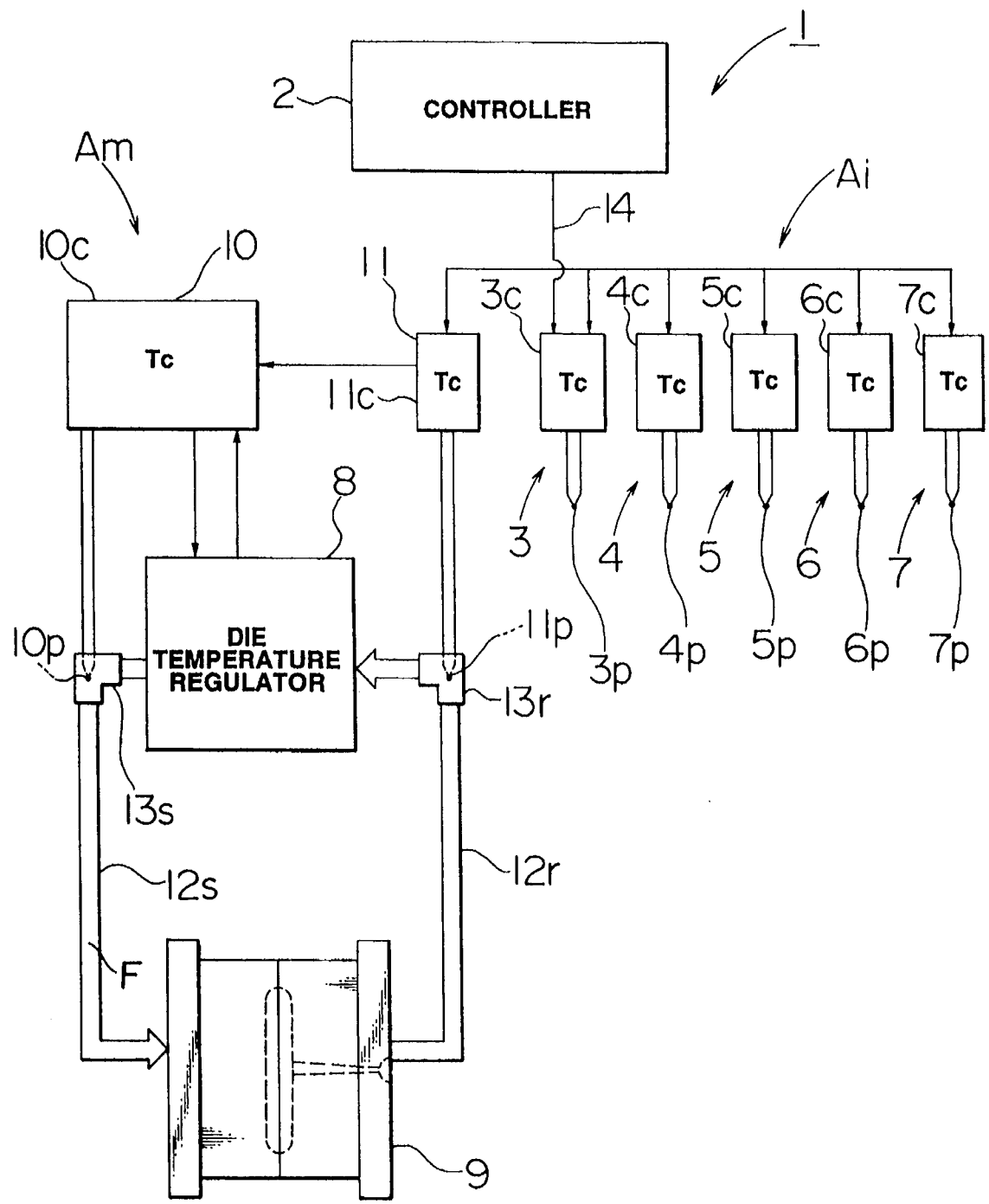
FIG. 1 illustrates a functional block circuit diagram of the temperature control unit of an embodiment of the present invention.
Figure 2:
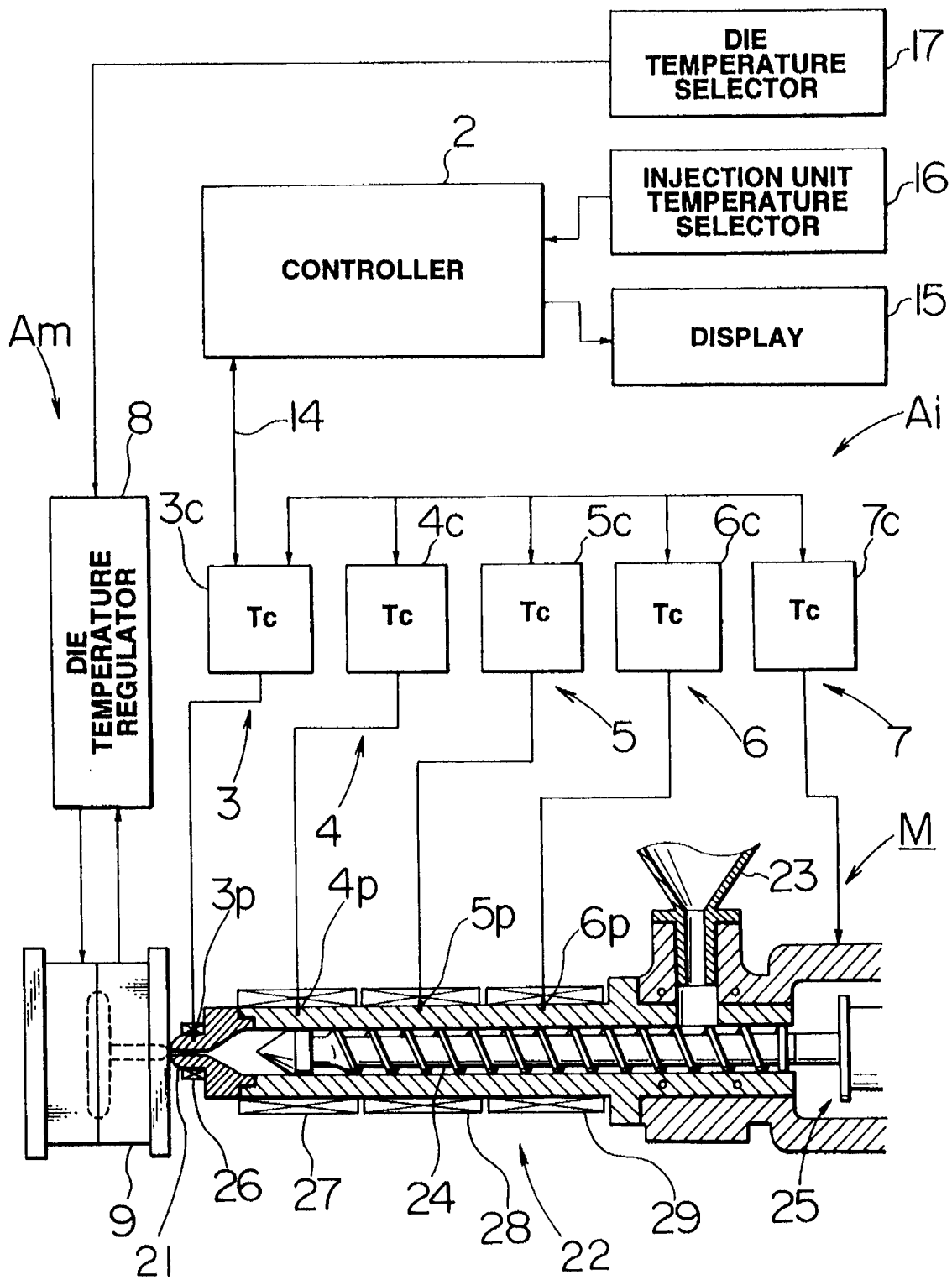
FIG. 2 is an illustrative diagram outlining an injection molding machine and a temperature control system.

Referring to FIGS. 1 and 2, configuration of the temperature control unit 1 related to the present invention is described hereunder.

In FIG. 1, reference numerals 3, 4, 5, 6, 7 denote respective heating control thermostats in injection unit. temperature control system Ai which are provided on the side of the injection molding machine with the exception of dies, namely, the injection unit M (FIG. 2).

Referring to FIG. 2, injection unit M is outlined hereunder. 22 stands for a barrel cylinder having injection nozzle 21 at the fore end thereof and hopper 23 at the rear end thereof to supply molding material to the interior of barrel cylinder 22. Further, barrel cylinder 22 has a built-in screw 24 inside, and at the rear part of the barrel cylinder, there are provided screw drive mechanism 25 with an oil motor, a hydraulic cylinder, etc. to rotate and move forth and back screw 24 and a hydraulic circuit (not shown). Further, injection nozzle 21 is equipped with heater 26, and at the fore, the intermediate, and the rear part of barrel cylinder 22, there are provided heater 27 for heating the metering zone, heater 28 for heating the compression zone, and heater 29 for heating the feed zone, respectively.

Further, at the fore, the intermediate and the rear part respectively of injection nozzle 21 and barrel cylinder 22, there are provided thermocouples $3p$, $4p$, $5p$, $6p$ each, while in the hydraulic circuit of screw drive mechanism 25, thermocouple 7

(FIG. 1) is provided for detecting the fluid temperature. Each of thermocouples $3p$, . . . are coupled to thermo-control $3c$, . . . whereby each of thermo-controls $3c$ and each corresponding thermocouple $3p$ provide a pair forming each of heating control thermostats 3, 4, 5, 6, 7.

Also, each of thermostats 3, . . . has a T-branch connection effected, using RS-485 (trade name), with thermostat 3 serving as a master thermostat coupled to controller 2 via data communication line 14 comprising an optical fiber cable. Controller 2 has a computer function including an arithmetic unit, a memory unit, a control unit plus input and output unit.

Meanwhile, dies 9 in front of injection nozzle 21 are coupled to die temperature regulator 8 while being provided with die temperature control system Am. In this case, dies 9 are provided with a channel therein to flow fluid F (heat transfer medium) therethrough and each fluid inlet of dies 9 are joined to a fluid outlet of die temperature regulator 8 by means of piping $12s$ while each fluid outlet of dies 9 are connected to a fluid return port of die temperature regulator 8 through piping $12r$. Die temperature regulator 8 is provided with a built-in heating mechanism and a cooling mechanism and has a fluid circulating function, whereby fluid F is circulated through die 9 after being heated or cooled for regulating its temperature to a prescribed temperature.

Further, joint $13r$ is connected midway of piping $12r$, and using this joint $13r$, there is provided heating control (heating only) second thermostat 11 to detect the temperature of fluid F (return side) while joint $13s$ is coupled midway of piping $12s$ and using this joint $13s$, heating/cooling dual control thermostat (first thermostat) 10 is also provided to detect the temperature off fluid F (supply side). Thermo-control $10c$ and thermocouple $10p$ form heating/cooling dual control thermostat 10. Thermo-control $11c$ and thermocouple $11p$ from thermostat 11.

Furthermore, first thermostat 10 is connected to die temperature regulator 8, whereby a local control system is formed. Accordingly, for first thermostat 10, a command value of temperature is externally selected previously in addition to various settings such as PID constant setting, etc., for heating or cooling.

On the other hand, second thermostat 11 is coupled to each of heating control thermostats 3, ... serving with injection unit M through the T-branch connection using, for example, RS-485, etc. whereby thermostat 11 is allowed to have data communication with controller 2, same as each of heating control thermostats 3, ... provided for injection unit M. Further, second thermostat 11 and first thermostat 10 are coupled together in a cascade connection, whereby the second thermostat 11 feeds a given controlled variable (command value) based on its own detected value and a setpoint (command value)to first thermostat 10, with second thermostat 11 thus becoming a master thermostat and first thermostat 10 a slave thermostat.

Next, with reference to FIGS. 1 and 2, functions of temperature control unit 1 related to the present invention are described hereunder.

First, serial data communication is performed between each of thermostats 3, ... of injection unit temperature control system Ai and controller 2, and further between second thermostat 11 of die temperature control system Am and controller 2, respectively, according to the polling select system. Namely, in response to each of the calls from controller 2, thermostats 3, ... and second thermostat 11 are selected while each of the values of temperature $D_3$, $D_4$, $D_5$, $D_6$, $D_7$, $D_{11}$ detected by thermostats 3, ... and second thermostat 11 are transmitted sequentially to controller 2 and displayed on the display 15 (FIG. 2) of the controller. Meanwhile, command values of temperature $S_3$, $S_4$, $S_5$, $S_6$, $S_7$ designated by injection unit temperature selector 16 at controller 2 are transferred to each of thermostats 3, ..., whereby feedback control of injection unit temperature is performed while command value Sm designated for die temperature, which can be set by controller 2, is also transferred to thermostat 11, to perform feedback control of die temperature.

In this case, second thermostat 11 undertakes die temperature control by detecting the temperature of fluid F flowing out from dies 9, following command value Sm from controller 2 while first thermostat 10 performs heating/cooling dual control of die temperature regulator 8 according to a variety of setpoints locally selected in advance. Also, with the cascade control system the controlled variable based on the detected value and set point of second thermostat 11 is outputted as a command value for heating/cooling dual control thermostat 10, whereby heating/cooling dual control thermostat 10 is controlled according to said command value.

As a result, in addition to temperature control of injection unit M by controller 2, data communications between second thermostat 11 serving with die temperature control system Am and controller 2 become possible and injection unit temperature control system Ai and die temperature control system Am become remotely controllable from controller 2 via the same data communication line, while achieving a highly stabilized temperature control according to the cascade control system.

Some preferred embodiments of the present invention have been described in the foregoing. However, the present invention is by no means limited to these embodiments only but can be optionally modified in its constitution of details, process, and so forth without deviating from the spirit and scope of the present invention.

We claim:

1. A temperature control unit for an injection molding machine comprising:

an injection unit temperature control system, for controlling injection unit temperatures of the injection molding machine, having a first heating control thermostat communicatively connected to a controller; and a die temperature control system for circulating fluid which is temperature regulated by a die temperature regulator through dies of the injection molding machine and for controlling die temperatures using a heating/cooling dual control thermostat, said die temperature control system having a second heating control thermostat for detecting the temperature of the fluid flowing out from the dies, said second heating control thermostat and said first being control thermostat; being coupled together and said heating/cooling dual control thermostat detecting the temperature of the fluid flowing into the dies, said heating/cooling dual control thermostat and said second heating control thermostat being coupled to each other in a cascade connection.

2. The temperature control unit of claim 1, wherein each of said first and second heating control thermostats and said heating/cooling dual control thermostat comprises a thermocouple and a thermo-control unit.

3. The temperature control unit of claim 1, wherein said controller and said first heating control thermostat are coupled together to be capable of serial communicating by a polling select system.

4. A temperature control system for an injection molding apparatus, the injection molding apparatus including an injection unit and dies, the injection unit having a plurality of heaters for heating mold material flowing within the injection unit, the temperature control system comprising:

a plurality of first heating control thermostats, mounted on the injection unit, for controlling the temperature of the plurality of heaters;

die regulating means for circulating a heat transfer fluid through the dies and for regulating a temperature of the heat transfer fluid;

a heating/cooling dual control thermostat for detecting a temperature of the heat transfer fluid flowing into the dies and for controlling regulation of the heat transfer fluid by said die regulating means;

a second heating control thermostat for detecting a temperature of the heat transfer fluid flowing out of the dies; and control means, coupled to said plurality of first heating control thermostats, for providing heater command temperature values for said plurality of first heating control thermostats, said plurality of first heating control thermostats and said second heating control thermostat being coupled together to provide a die command temperature value from said control means to said second heating control thermostat, said second heating control thermostat being coupled in cascade to said heating/cooling dual control thermostat to provide a heating/cooling command value to said heating/cooling dual control thermostat based on a detected temperature value and the die temperature command value.

5. The temperature control system of claim 4, wherein each of said plurality of first heating control thermostats, said second heating control thermostat and said heating/ cooling dual control thermostat comprise a thermocouple and a thermo-control unit.

6. The temperature control system of claim 4, wherein said control means communicates with said plurality of first heating control thermostats and said second heating control thermostat by a polling select system.

7. The temperature control system of claim 4, wherein said plurality of first heating control thermostats comprise a master thermostat coupled to said control means and a plurality of slave thermostats coupled to said master thermostat via T-branch connections.

8. The temperature control system of claim 7, wherein said master thermostat is coupled to said controller via an optical fiber.

9. A temperature control system for an injection molding apparatus, the injection molding apparatus including an injection unit and dies, the temperature control system comprising:

first heating means mounted on the injection unit for controlling heating of a mold material flowing within the injection unit;

die regulating means for circulating a heat transfer fluid through the dies and for regulating a temperature of the heat transfer fluid;

heating/cooling control means, coupled to said first heating means, for detecting temperatures of the heat transfer fluid flowing into and out of the dies and for controlling regulation of the temperature of the heat transfer fluid by said die regulating means; and control means, coupled to said first heating means, for providing injection unit heat command temperature values for said first heating means and a die heat command temperature value for said heating/cooling control means through said first heating means, said heating/cooling control means controlling regulation of the temperature of the heat transfer fluid in accordance with the detected temperatures of the heat transfer fluid flowing into and out of the dies and the die heat command temperature value.

10. The temperature control system of claim 9, wherein said first heating means comprises:

a plurality of heaters, mounted on the injection unit, for heating mold material flowing within the injection unit; and a plurality of first heating control thermostats, mounted on the injection unit, for respectively controlling the temperature of said plurality of heaters in accordance with the injection unit heat command temperature values.

11. The temperature control system of claim 10, wherein each of said plurality of first heating control thermostats comprise a thermocouple and a thermo-control unit.

12. The temperature control system of claim 9, wherein said heating/cooling control means comprises:

a first heating control thermostat for detecting the temperature of the heat transfer fluid flowing out of the dies; and a heating/cooling dual control thermostat, coupled in cascade to said first heating control thermostat, for detecting the temperature of the heat transfer fluid flowing into the dies and for controlling regulation of the temperature of the heat transfer fluid by said die regulating means.

13. The temperature control system of claim 12, wherein said first heating means and said first heating control thermostat are coupled together to provide the die heat command temperature value from said control means to said first heating control thermostat, said first heating control thermostat providing a heating/cooling command value to said heating/cooling dual control thermostat based on the detected temperature of the heat transfer fluid flowing out of the dies and the die heat command temperature value.

14. The temperature control system of claim 13, wherein said heating/cooling dual control thermostat controls regulation of the temperature of the heat transfer fluid in accordance with the detected temperature of the heat transfer fluid flowing into the dies and the heating/cooling command value.

15. The temperature control system of claim 12, wherein said first heating control thermostat and said heating/cooling dual control thermostat each comprise a thermocouple and a thermo-control unit.

* * * * *